United States Patent [19]
Tobias

[11] Patent Number: 5,310,017
[45] Date of Patent: May 10, 1994

[54] VIBRATION ISOLATION SUPPORT MOUNTING SYSTEM

[76] Inventor: Jaromir Tobias, 322 E. 57th St., New York, N.Y. 10022

[21] Appl. No.: 855,845

[22] Filed: Mar. 20, 1992

Related U.S. Application Data

[60] Division of Ser. No. 474,329, Feb. 2, 1990, Pat. No. 5,101,929, which is a continuation-in-part of Ser. No. 381,197, Jul. 18, 1989, Pat. No. 5,062,498, and Ser. No. 414,254, Sep. 29, 1989, Pat. No. 5,050,835, and Ser. No. 463,259, Jan. 9, 1990, Pat. No. 5,168,703.

[51] Int. Cl.⁵ ............................................. B62D 21/00
[52] U.S. Cl. ..................................... 180/291; 180/300; 180/306; 180/312; 248/562; 248/637
[58] Field of Search ............... 180/291, 300, 312, 306; 188/275, 279, 280; 248/550, 571, 583, 631, 632, 562; 244/17.25, 17.27, 17.13; 267/136

[56] References Cited

U.S. PATENT DOCUMENTS

| | | |
|---|---|---|
| 880,257 | 2/1908 | Welch . |
| 900,342 | 10/1908 | Ashley ............................ 60/425 X |
| 1,216,761 | 2/1917 | York . |
| 1,991,579 | 2/1935 | Sampson ......................... 248/14.2 |
| 2,100,404 | 11/1937 | Mason et al. ...................... 138/26 |
| 2,239,612 | 4/1941 | Lawlor ............................... 210/26 |
| 2,240,011 | 4/1941 | Casey ................................. 60/418 |
| 2,355,357 | 8/1944 | Adams et al. .................. 60/413 X |
| 2,363,977 | 11/1944 | Kucher ............................... 180/306 |
| 2,396,653 | 3/1946 | Hermanny ........................ 137/78 |
| 2,704,131 | 3/1955 | Vahs ................................. 180/306 |
| 2,727,470 | 12/1955 | Ludwig ............................. 103/223 |
| 2,846,850 | 8/1958 | Hall .................................... 60/97 |
| 2,850,869 | 9/1958 | Forster ........................ 60/415 X |
| 2,850,878 | 9/1958 | Sampietro et al. ............... 60/418 |
| 2,882,592 | 4/1959 | Bouvcru De Carbon ....... 60/418 |
| 3,023,579 | 3/1962 | Bookout et al. ................... 60/418 |
| 3,157,202 | 11/1964 | Sadler et al. .................... 138/26 |
| 3,281,101 | 11/1966 | May ................................ 248/550 |
| 3,343,560 | 9/1967 | Nankivell ......................... 137/207 |
| 3,365,191 | 1/1968 | Ellis, Jr. et al. ............... 267/64.26 |
| 3,459,395 | 8/1969 | Scotto .............................. 248/20 |
| 3,513,929 | 5/1970 | Kim ............................. 60/415 X |
| 3,587,233 | 6/1971 | Fischbach .................... 60/418 X |
| 3,669,150 | 6/1972 | Everett ............................. 138/26 |
| 3,690,607 | 9/1972 | Mard ................................ 248/550 |
| 3,709,104 | 1/1973 | Culberson ......................... 91/495 |
| 3,784,146 | 1/1974 | Matthews ......................... 248/562 |
| 3,806,105 | 4/1974 | Knoishi et al. ................. 267/116 |
| 3,828,555 | 8/1974 | Capdevielle ....................... 60/413 |
| 3,886,848 | 6/1975 | Budecker et al. ............. 60/418 X |
| 3,891,045 | 6/1975 | Pancella ...................... 180/306 X |
| 3,892,283 | 7/1975 | Johnson ....................... 60/413 X |
| 3,918,847 | 11/1975 | Junck et al. ................. 60/418 X |
| 3,945,663 | 3/1976 | Duckett ............................ 280/708 |
| 3,957,128 | 5/1976 | Le Salver et al. ............. 180/64 R |
| 3,962,872 | 6/1976 | Budzich ....................... 60/414 X |
| 3,964,260 | 6/1976 | Williams et al. .................. 60/413 |
| 3,984,978 | 10/1976 | Alderson ..................... 180/306 X |
| 4,057,073 | 11/1977 | Adams .......................... 60/422 X |
| 4,064,694 | 12/1977 | Baudoin ............................. 60/413 |
| 4,161,906 | 7/1979 | Tobias ................................ 91/498 |

(List continued on next page.)

FOREIGN PATENT DOCUMENTS 3543073 6/1984 Fed. Rep. of Germany .
1059321 12/1983 U.S.S.R. .

OTHER PUBLICATIONS

Shames, Irving H., Mechanics of Fluids, 2nd Ed., N.Y., N.Y., McGraw-Hill Book Co., 1982, pp. 258-260.
Society of Automotive Engineers, Apr., 1959; "Coming? Central Hydraulics", pp. 26-31.

Primary Examiner—Richard M. Camby
Attorney, Agent, or Firm—Antonelli, Terry, Stout & Kraus

[57] ABSTRACT

A continuously active pressure accumulator power transfer system for a vehicle or the like comprises an engine, a pump driven by the engine, a main pressure accumulator maintained at a substantially constant fluid pressure and fluid volume by the pump during operation, a fluid motor for propelling the vehicle which is supplied with driving fluid pressure from the main pressure accumulator and a second pressure accumulator at a lower pressure then the main accumulator for supplying fluid to at least one vibration isolation mount.

18 Claims, 6 Drawing Sheets

U.S. PATENT DOCUMENTS

| | | | |
|---|---|---|---|
| 4,165,677 | 8/1979 | Tobias | 91/497 |
| 4,215,545 | 8/1980 | Morello et al. | 60/413 |
| 4,215,624 | 8/1980 | Tobias | 91/499 |
| 4,227,587 | 10/1980 | Carman | 180/165 |
| 4,240,515 | 12/1980 | Kirkwood | 60/413 X |
| 4,246,978 | 1/1981 | Schulz et al. | 60/414 |
| 4,348,863 | 9/1982 | Taylor et al. | 60/413 |
| 4,350,220 | 9/1982 | Carman | 180/165 |
| 4,352,487 | 10/1982 | Shtarkman | 267/35 |
| 4,370,714 | 1/1983 | Rettich et al. | 91/429 X |
| 4,503,928 | 3/1985 | Mallen-Herrero et al. | 108/308 |
| 4,527,954 | 7/1985 | Murali et al. | 91/361 X |
| 4,553,744 | 11/1985 | Konishi et al. | 267/140.1 |
| 4,557,678 | 12/1985 | Nishimura | 418/180 |
| 4,616,478 | 10/1986 | Jensen | 60/487 |
| 4,627,239 | 12/1986 | Nishimune et al. | 60/484 |
| 4,688,776 | 8/1987 | Lecour et al. | 267/140.1 |
| 4,712,376 | 12/1987 | Hadank et al. | 60/484 X |
| 4,721,292 | 1/1988 | Saito | 267/140.1 |
| 4,735,296 | 4/1988 | Pinson | 188/379 |
| 4,741,247 | 3/1988 | Glomeau et al. | 60/484 X |
| 4,741,410 | 3/1988 | Tunmore | 180/165 |
| 4,745,745 | 5/1988 | Hagin | 60/413 X |
| 4,752,195 | 6/1988 | Friedrich et al. | 417/540 |
| 4,762,306 | 8/1988 | Watanabe et al. | 248/631 |
| 4,769,989 | 9/1988 | Ostwald et al. | 60/418 X |
| 4,788,949 | 12/1988 | Best et al. | 103/192 R |
| 4,801,245 | 1/1989 | De Haas et al. | 417/53 |
| 4,858,898 | 8/1989 | Niikura et al. | 267/218 |
| 4,888,949 | 12/1989 | Rogers | 60/434 |
| 4,903,792 | 2/1990 | Ze-Ying | 180/308 |

VIBRATION ISOLATION SUPPORT MOUNTING SYSTEM

REFERENCE TO RELATED APPLICATIONS

This is a divisional of application Ser. No. 07/474,329 filed Feb. 2, 1990, now U.S. Pat. No. 5,101,929 which in turn is a continuation in part application of prior co-pending U.S. patent applications Ser. No. 07/381,197 filed Jul. 18, 1989, now U.S. Pat. No. 5,062,498 issued Nov. 5, 1991; Ser. No. 07/414,254 filed Sep. 29, 1989, now U.S. Pat. No. 5,050,835 issued Sep. 24, 1991 and Ser. No.07/463,259 filed Jan. 9, 1990 Pat. No. 5,186,703.

TECHNICAL FIELD

The present invention relates to a vibration absorbing system for absorbing mechanical vibrations, such as reciprocating engine induced mechanical vibration.

BACKGROUND ART

There are many commercial and industrial environments where engines or other vibration inducing mechanisms are supported at relatively fixed structure with some type of vibration damping system interposed between the support structure and the vibrating mechanism. For example, internal combustion engine driven vehicles are provided with shock absorbing engine mounts which are intended to limit the transmission of engine vibrations into the vehicle body frame and vice versa.

Certain prior art vehicle engine mounts comprise elastically deformable hard rubber cushions or the like for cushioning the transfer of vibrations between the engine and the vehicle frame. Such solid elastically deformable engine mounts do help isolate the vehicle body frame carrying the engine from engine induced mechanical vibrations and the engine from vehicle induced vibrations. However, such engine mounts suffer from disadvantages in that they are unable to attenuate the wide range of mechanical vibrations experienced in use on an automobile For example, an automobile is designed to operate under many speed, torque, acceleration and deceleration conditions, all of which create different mechanical vibration force, frequency and amplitude patterns. The above-mentioned conventional shock absorber type engine mounts are preset and passive in that they only passively react to vibration forces based on their preset elastic design characteristics. Such vibration isolation mounts can be designed to operate quite well over certain narrow mechanical vibration patterns. However, it is impractical, if not impossible, to design effective preset passive isolation vibration mounts which can attenuate vibrations over all operating ranges of the engine and vehicle.

Certain other prior art vehicle engine mounts utilize a closed fluid shock absorber system for cushioning the transfer of vibrations between the engine and the vehicle frame. Since these fluid shock absorber mounts are closed systems, they act much like the elastically deformable spring or hard rubber cushion mounts discussed above. Further, in cases of large relative movement between the parts being supported, the shock attenuation substantially diminishes as the fluid pressure rises. Although certain shock absorber mounts provide for multiple fluid chambers and different flow paths depending upon the relative displacement of the parts being supported, such systems are very complex and costly to construct and are also ultimately limited by the total volume of fluid and fluid accommodating space in the overall closed system at an individual shock absorber mount.

The above-mentioned prior art arrangements thus permit an unacceptable level of transfer of vibration forces between the engine and the vehicle frame, and/or involve very complicated, expensive and space wasting constructions.

The mechanical vibration problems of internal combustion engine driven automotive vehicles discussed above are but one example of complex mechanical vibration problems that occur. Another example is a drive assembly support for the rotor blades of a helicopter Such helicopter rotor blade drive assemblies further compound the mechanical vibrations that should be attenuated. Prior attempts to attenuate vibrating force transfers between helicopter blade drive assemblies and the helicopter body or helicopter passenger compartment meet with similar difficulties as described above for the motor vehicles driving on the ground, due again to the wide spectrum of vibration force, frequency and amplitude which are experienced during the helicopter operation. Mechanical vibration isolation problems also occur in stationary engine environments such as driving engines for heating and air conditioning units mounted on commercial buildings or stationary engine electrical generators used at construction sites and at remote areas where electric power must be generated. In these installations, it is desired to minimize mechanical vibration force transfers between the engine and pumps or generators driven by same so as to minimize noise and minimize vibration induced mechanical failures An exemplary environment where reduction of mechanical vibration transfer is especially desired involves so-called top floor "penthouse" spaces of large commercial buildings with rooftop heating, venting and air conditioning systems (HVAC systems). Due to vibration induced sound and actual vibration movement of the floors and walls caused by the rooftop HVAC systems, top floors of such buildings are not desirable prime office or living spaces. Again, prior attempts to passively mount the large generators, pumps, etc, for such HVAC systems can only imperfectly and inefficiently respond to the induced mechanical vibration and especially to changes in the vibration spectrum occurring during operations.

DISCLOSURE OF INVENTION

The present invention is directed at providing a simple, economical, effective mechanical vibration absorbing system which can respond to a wide range of induced vibration forces, frequencies and amplitudes. The present invention is further directed at overcoming the bove-noted problems with prior art arrangements.

These objects are achieved according to the present invention by providing an "active" vibration absorbing system which utilizes a relatively large main fluid pressure accumulator which is actively continuously maintained at a predetermined fluid pressure by a fluid pumping system, and one or more vibration absorber mounts interposed between relatively fixed support structure and the motor or other device inducing the mechanical vibrations, these vibration absorber mounts being continuously acted on by fluid pressure from the main accumulator. The vibration absorber mounts which are constantly in communication with the predetermined pressure of the main accumulator source are effective as responsive vibration absorbers which automatically accommodate for changes in the vibration force, amplitude, and frequency over a wide range.

Due to the relatively small volume of the individual vibration absorber mounts as compared to the main accumulator, restoring pressure fluid supply to the individual mounts is applied in a rapid and reliable manner. In especially preferred embodiments, the hydraulic fluid accommodating volume of the main accumulator is substantially greater than the total volume of all of the individual vibration absorbing mounts connected thereto. In certain preferred embodiments the volume in the main accumulator is more than 10 times the volume of each of the respective vibration absorber mounts connected thereto, including the high pressure connecting lines.

In preferred embodiments of the invention, the main accumulator and pump supplying same are designed so as to provide sufficient fluid pressure and volume response at the individual vibration absorber mounts supplied thereby to handle the predetermined maximum expected vibration induced displacements of the entire system.

In especially preferred embodiments of the invention, the vibration absorber mounts interposed between the relatively fixed support structure and the engine or other vibration inducing mechanism are constructed as individual shock absorbing accumulators having a gas or other spring cushion acting in series with the pressure being supplied via the main accumulator. For example, with a passenger car vehicle engine mounting system, there would be supplied a pump, a main accumulator which is maintained at a constant pressure by the pump, and pressure lines leading from the main accumulator to the individual accumulators at the vibration absorber mounts, preferably distributed symmetrically with respect to the vehicle engine load.

According to certain preferred embodiments, individual vibration absorber support accumulators that are supplied by the main accumulator are constructed as piston and cylinder shock absorber mechanisms which have a fluid pressure space continuously in communication with the main accumulator. In especially preferred embodiments, the fixed and movable parts at the individual vibration support absorber accumulators are constructed as plates which are then in turn mounted to the respective vibration inducing moving part and the relatively fixed part supporting same.

In preferred embodiments of the invention the fluid pressure lines leading from the main accumulator to the individual vibration absorber support accumulators are one-way lines which "deadend" at the individual mounts. Thus, the system is quite simple and economical to construct, while still providing a continuously active support system which adapts to changes in the load "seen" or experienced at the individual mounts over a wide range of vibration displacements.

In especially preferred embodiments for automotive engine mounts, the individual vibration absorber accumulators are constructed to be supported in longitudinal body frame members of the vehicle body. This construction advantageously utilizes existing space on the vehicle body.

According to another embodiment of the invention, the vibration isolation support mounting system comprises a first, main hydraulic fluid accumulator means as well as a second hydraulic fluid accumulator means. Means are provided for communicating the pressurized hydraulic fluid from the first accumulator means to the second accumulator means for maintaining a second predetermined pressure in the second accumulator means which is lower than the first predetermined pressure maintained in the first hydraulic fluid accumulator means. In the illustrated embodiment the first hydraulic fluid accumulator means is maintained at a high pressure for driving fluid motor means of a vehicle for propelling the vehicle. A lower pressure is maintained in the second hydraulic fluid accumulator means for operating the load support vibration isolation mounts. Through the use of two active accumulators in series it is possible to more efficiently and quickly meet the different pressure and flow requirements of the fluid drive motors and vibration isolation mounts.

Another feature of the vibration isolation support mounting system of the invention is that, where a plurality of load support vibration isolation mounts are employed, the pressure spaces of the mounts are arranged in series along the high pressure fluid line means providing high pressure hydraulic fluid from the accumulator means. This type of an arrangement is particularly advantageous in a balanced system where relatively uniform loads are placed upon the respective mounts.

Where two active accumulators are used, each accumulator of the system includes spring cushion means which is preferably in the form of a gas cushion. Thus, a primary function of each active accumulator is to provide vibration insulation for the system components, rather than to serve only primarily as an energy storage device The gas cushion in each accumulator serves this purpose. In the disclosed embodiment, means are provided for communicating the first spring cushion means of each vibration isolation mount with the spring cushion means of the second accumulator means. A pump is provided for maintaining the gas pressure in the second accumulator means at a predetermined pressure. Since the spring cushion means of the vibration isolation mounts are continuously in communication with the gas cushion of the second accumulator means, an improved active attenuation of vibration movements is achieved. In the disclosed embodiment, the first spring cushion means of the plurality of mounts are arranged in series along the means for communicating the first spring cushion means with spring cushion with the spring cushion means of the second accumulator means.

Other objects, advantages and novel features of the present invention will become apparent from the following detailed description of the invention when considered in conjunction with the accompanying drawings.

DETAILED DESCRIPTION OF THE DRAWINGS

Figure 1:
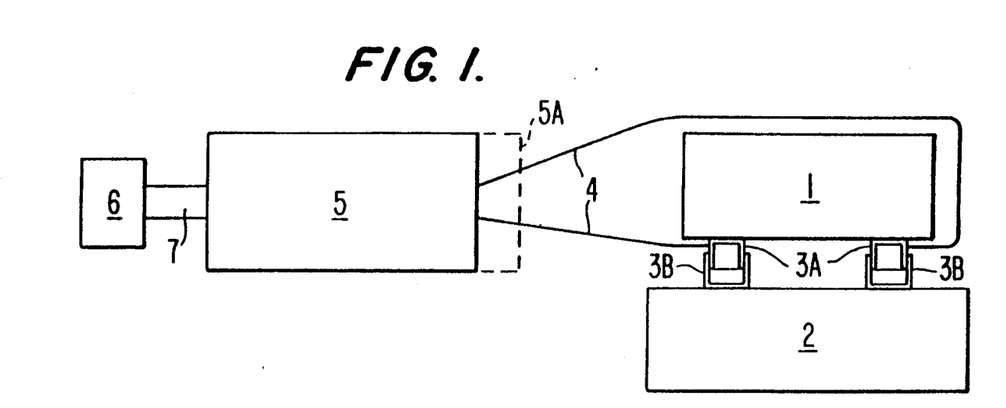
FIG. 1 is a schematic view showing an active accumulator vibration absorbing support system constructed in accordance with preferred embodiments of the invention.

FIG. 1 schematically depicts an active accumulator vibration isolation support system constructed according to a preferred embodiment of the present invention. A vibrating load 1, such as a vehicle engine or the like, is to be supported at a fixed support 2, such as a vehicle frame or the like, by means of vibration attenuating support mounts 3. Each of the support mounts 3 is continuously communicated with a high pressure line 4, in turn supplied by a constant high pressure from a main accumulator 5. A pump 6 and valve assembly 7 are provided for maintaining the main accumulator 5 continuously at a predetermined constant pressure The individual supports 3 include a first part 3A attached to move with the vibrating load 1 and a second part 3B attached to the fixed support 2, these parts 3A and 3B being movable with respect to one another against fluid pressure supplied via the high pressure lines 4. As described in more detail below with respect to the exemplary embodiments, the vibration mounts also include a gas cushion, spring cushion, or the like, in series connection with the high pressure fluid from lines 4.

The system schematically depicted in FIG. 1 operates as follows The pump 6 and main accumulator 5 continuously maintain a constant high pressure for the pressure lines 4 leading to the individual support mounts. Since the fluid pressure in lines 4 is connected directly in series with the vibrating load support, any relative vibration movements will be immediately sensed and transmitted by the hydraulic fluid pressure in lines 4. The main accumulator assures a quick response to pressure changes in lines 4 over a very wide range of relative vibration movements between parts 3A and 3B. The system is continuously "active" in that the large main accumulator is continuously maintained at a constant predetermined pressure to thereby effectively provide an effective extremely large volume for the pressure lines 4.

In especially preferred embodiments, a spring cushion in the form of a gas cushion is connected in series with the high pressure fluid in lines 4 at each of the individual support mounts 3. This combination of the gas cushion and the high pressure fluid maintained by the main accumulator, provides for attenuation of the force transfer between the vibrating load and the high pressure fluid and the restoration adjustment of the pressure in the lines 4. The lines 4 preferably deadend into the support mounts 3, without return lines, as they need only function to maintain the high volume, high pressure availability of the main accumulator to respond to the changes in the vibrating load. FIG. 1 also includes a schematic depiction, in dash lines, of a valve manifold 5A, which can be provided for control valves to control the flow of pressure fluid between the main accumulator and the respective pressure lines 4. These valves in manifold 5A are controllable as a function of the experienced pressure in the lines 4 and/or of the vibrating load displacement, to thereby provide an active attenuation of the vibration movements.

Figure 2:
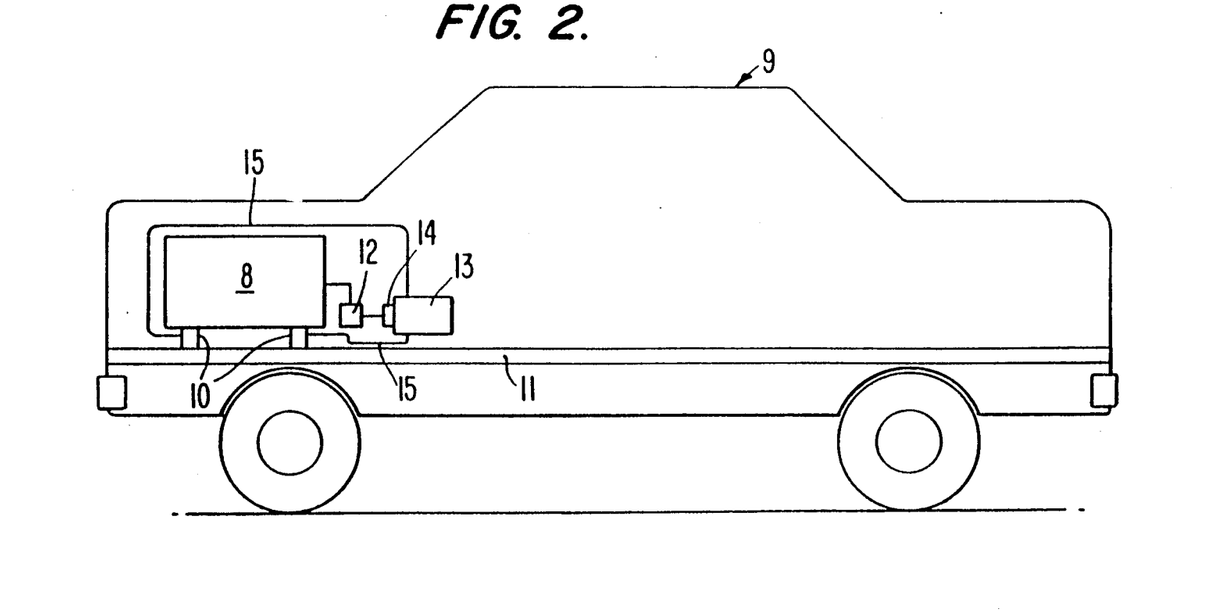
FIG. 2 is a schematic view depicting the active accumulator vibration absorbing support system applied to a motor vehicle engine mounting system, in accordance with a preferred embodiment of the invention.

FIG. 2 schematically depicts a preferred embodiment of the invention used to mount an engine 8 in a vehicle 9. The engine 8 is to be supported by the vibration isolation mounts 10 constructed according to the invention, at longitudinal vehicle frame members 11. In FIG. 2, the pump 12 and main accumulator 13 are connected so as to be operationally maintained by the driving of the engine 8. That is, the engine 8 will, via a belt drive or the like connected to the crank shaft, operate to continuously drive the pump 12. The control valve assembly 14 is to be controlled to supply a constant pressure in the main accumulator 13. The high pressure lines 15 from the main accumulator to the individual vibration mount supports 10 can be quite small diameter tubing that can be readily accommodated in the engine compartment. As discussed below with respect to FIGS. 3 and 4, the individual mounting supports 10 are integrated into the vehicle frame structure so as to minimize space requirements.

Figure 3:
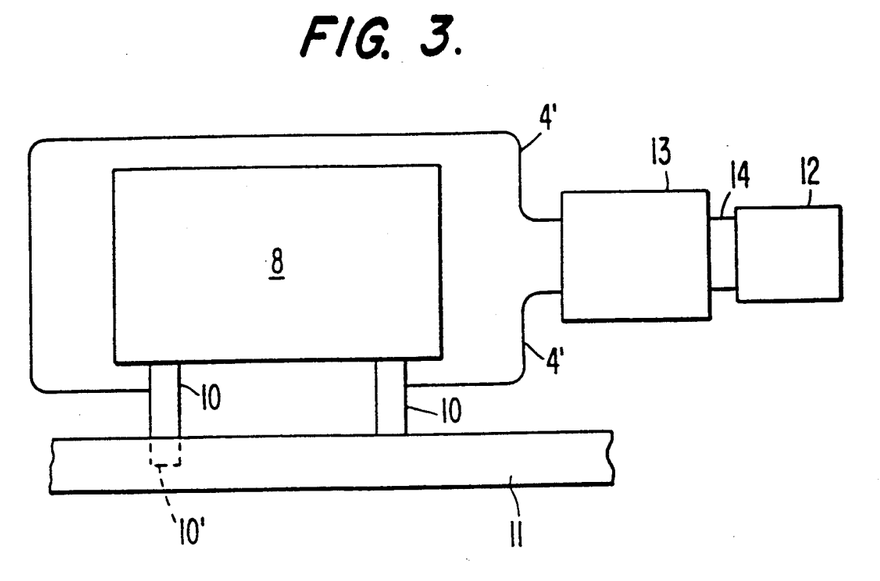
FIG. 3 is a schematic enlarged lateral view of the motor vehicle engine mounting system of FIG. 2.
Figure 4:
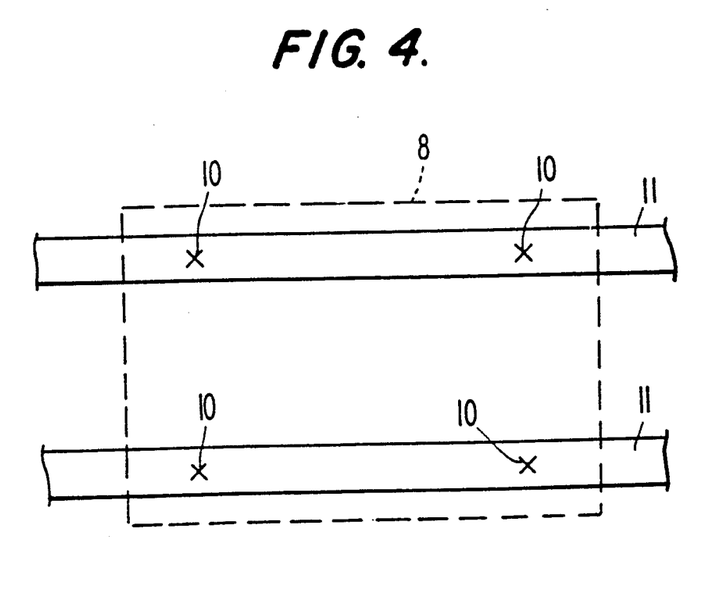
FIG. 4 is a schematic plan view depicting the location of the engine mounts of FIGS. 2 and 3 at the vehicle frame.

FIGS. 3 and 4 schematically depict the location of the vibration support mounts 10 at fixed frame members 11 of the vehicle. The individual supports 10 include lower parts 10' shown in dash lines in FIG. 3, which are encapsulated within the contours of the fixed frame members 11, which are usually constructed as U-shaped or of other open space configuration which provides mounting spaces that can be utilized.

Figure 5:
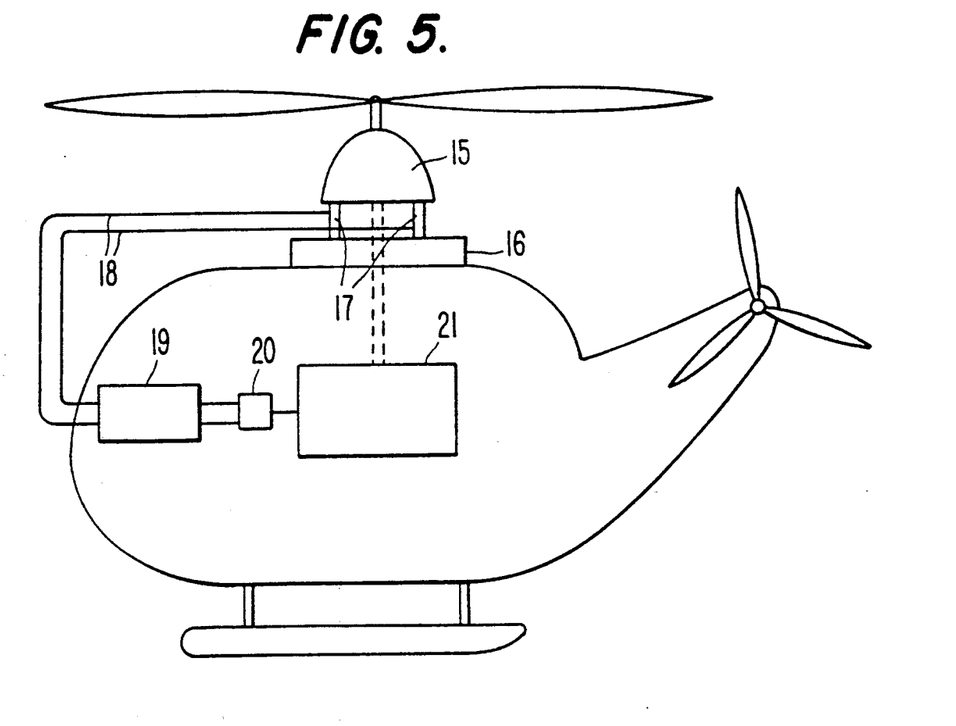
FIG. 5 is a schematic view depicting an active accumulator vibration absorbing support system applied to a mounting system for a helicopter blade drive assembly, constructed in accordance with a preferred embodiment of the invention.

FIG. 5 schematically depicts application of the support system for a helicopter blade drive assembly. The helicopter blade drive assembly 15 is supported at the helicopter body frame 16 by means of a plurality of vibration supports 17 connected via high pressure lines 18 to a main accumulator 19 supplied by a pump 20 driven by the helicopter engine 21.

Figure 6:
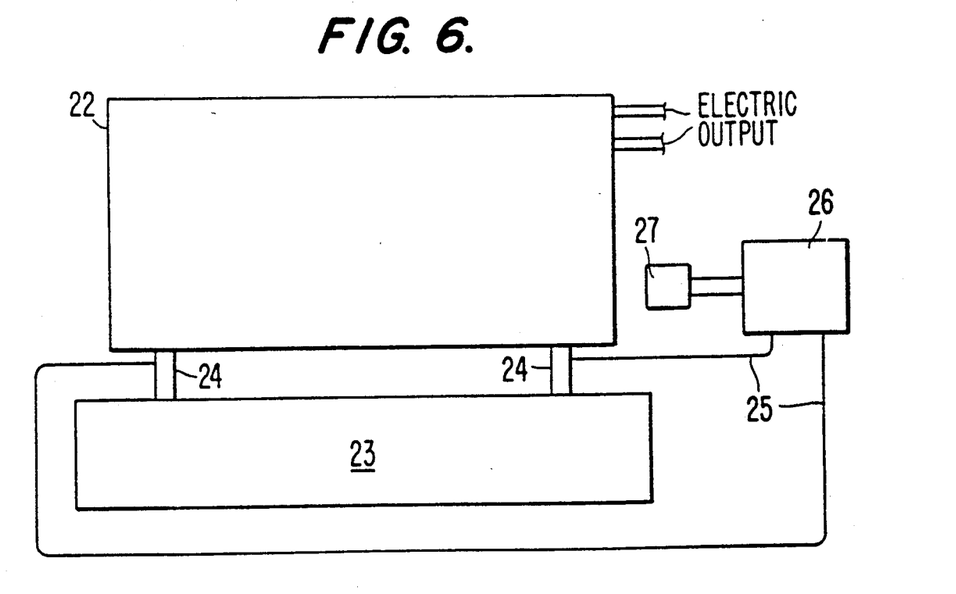
FIG. 6 is a schematic view depicting an active accumulator vibration absorbing support system applied to a mounting system for a large mega generator station assembly, constructed in accordance with a preferred embodiment of the invention.

FIG. 6 schematically depicts an embodiment of the invention in use in supporting a large mega generator 22 at a fixed ground support 23. The support system includes a plurality of vibration isolation support mounts 24 which are each in turn connected by high pressure lines 25 to a high pressure accumulator 26 supplied by pump 27.

Figure 7:
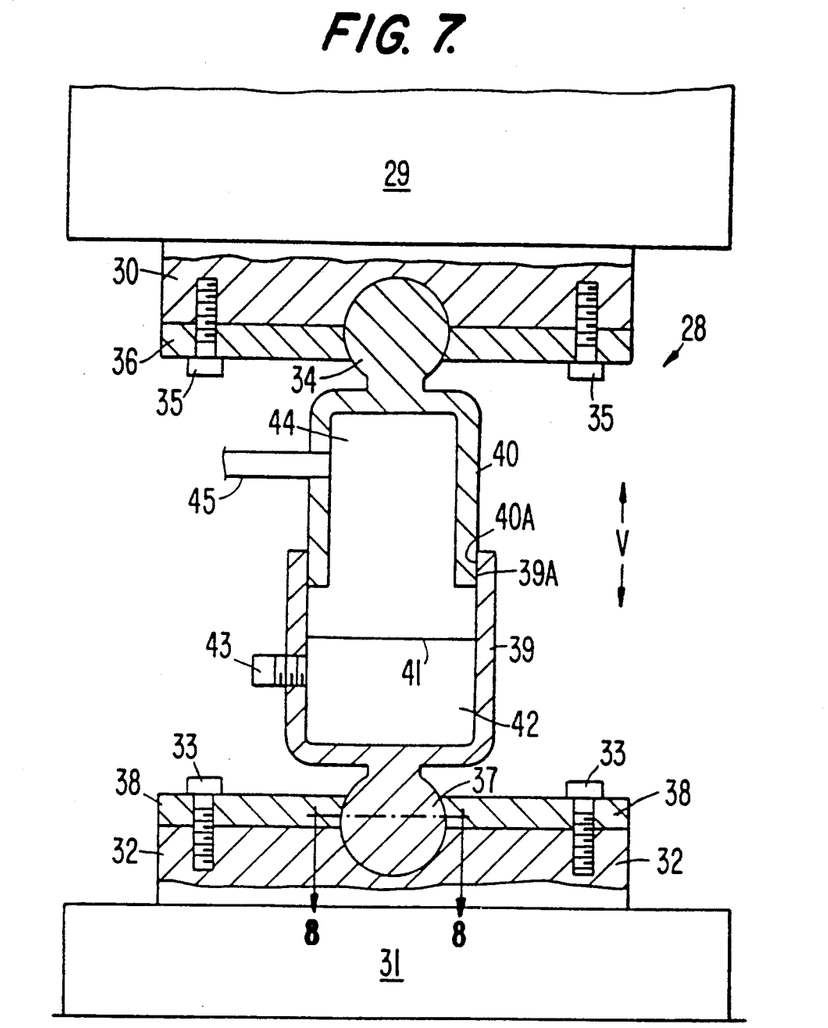
FIG. 7 is a schematic sectional view showing an individual vibration support mount constructed according to a preferred embodiment of the present invention.
Figure 8:
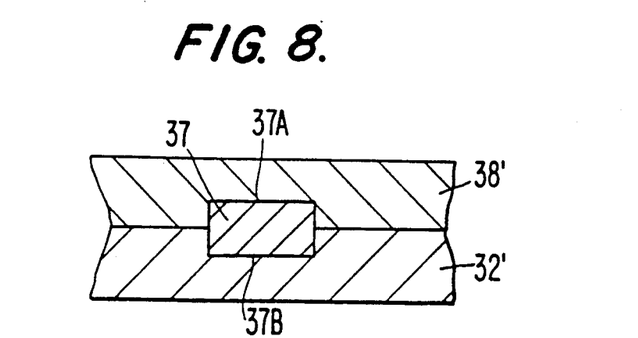
FIG. 8 is a schematic sectional view showing a detail of FIG. 7 taken along line 8—8.

FIG. 7 schematically depicts a preferred embodiment of a single support mount 28 which can be used as one of the respective mounts 3, 10, etc. generally described with respect to the installation arrangements above The vibrating part 29, such as a vehicle engine, generator unit, or helicopter blade drive assembly is provided with a first mounting plate 30 fixed at the underside thereof A second mounting plate 32 is detachably fixable by way of threaded bolts 33 to the relatively fixed support structure 31, such as the vehicle frame. A spherical joint member 34 is connected via bolts 35 and connecting plate 36 with the plate 30 so as to permit universal pivoting movement of the part 34 within the socket defined by the plates 30 and 36. In a similar manner, a second spherical joint member 37 is detachably attached by the bolts 33 and attaching plate 38 with the mounting plate 32. Due to the spherical ball joint connection by way of members 34 and 37, relative pivotal movements are permitted thereof with bearing guidance over the surface of the spherical ball joints. FIG. 8 schematically depicts an alternative embodiment wherein spherical member 37 is cut away to form parallel guide surfaces 37A and 37B which are guided in corresponding guide surfaces at the mounting plates 32, 38 so as to permit relative pivotal movement about one axis, while preventing pivotal movement about any other axis. This guided control of the relative pivotal movement can be advantageously applied in certain preferred embodiments of vehicle engine mounts to limit engine movements in the direction of its crankshaft axis.

Other preferred embodiments are contemplated wherein different shaped joint connections are provided at the mounting plates so as to control the variable degrees of movement between the joint members 34, 37 and respective engine 29 and frame 31, which are connected by the mounting support 28.

The lower ball member 37 is fixedly attached to a lower cylinder part 39, which opens upwardly to accommodate a second cylindrical part 40 attached to the ball member 34. The cylinder parts 39 and 40 include inter-engaging sliding surfaces 39A and 40A which guide relative axial movement of the parts 39 and 40 with respect to one another in response to vibration induced relative movement of the mass 29 being supported and the fixed frame support 31. A diaphragm 41 is provided in the cylinder part 39 for closing off a gas filled space 42. Gas is supplied to the space 42 by a removable closing plug 43, which can be provided with a safety valve. An upper space 44 in the cylinder part 40 is filled with pressurized hydraulic fluid which is in constant communication with a pressure line 45. The pressure line 45 is in turn in constant communication with a main accumulator, such as the accumulator 5 described above with respect to FIG. 1, the accumulator 13 described above with respect to FIG. 2 and the accumulator for the helicopter embodiment. The gas in space 42 could also be mixed with liquid in certain applications to stiffen the cushion. The movement of the diaphragm or other separating member, e.g. thin steel plates or membranes, 41 could also be limited, by stops, for example, to limit pressurization of the cushion gas or gas-liquid mixture, in the case of high loads and frequencies. The size and volume of the gas or gas-liquid cushion/chamber can be varied relative to the hydraulic fluid/chamber depending on the application requirements, as will be readily understood by the skilled artisan.

In operation of the mount 28 shown in FIG. 7, the vibrating movements depicted by the double arrow "V" of the part 29 are transmitted to the fixed support part 31 with a vibration attenuation and restoring force being exerted by the series connected gas chamber 42 and fluid pressure chamber 44 acting on the cylinder parts 39, 40. The ball joint connections 34, 37 permit desired relative pivotal movement in addition to the axial movement "V". The supply of pressure from the main accumulator via line 45 to the individual accumulator fluid space 42 assures that the individual support mount effectively sees an almost infinite volume of fluid pressure Since a constant pressure source is supplied by the line 45, changes in the load at the part 29 are easily accommodated as appropriate restoring force will be provided via the line 45. The cylinder parts 39, 40 are provided with appropriate limit stops so that the unit does not come apart in response to substantial changes in the load otherwise tending to separate the cylinder parts 39, 40.

The preferred embodiments described above for the individual support mount 10 with respect to FIG. 7 included a slidable piston cylinder connection permitting universal pivotal relative movement at the joint connection of the vibrating load and the fixed support structure. As noted above with respect to FIG. 8, the present invention contemplates various types of connections that would permit other types of relative movement.

Figure 9:
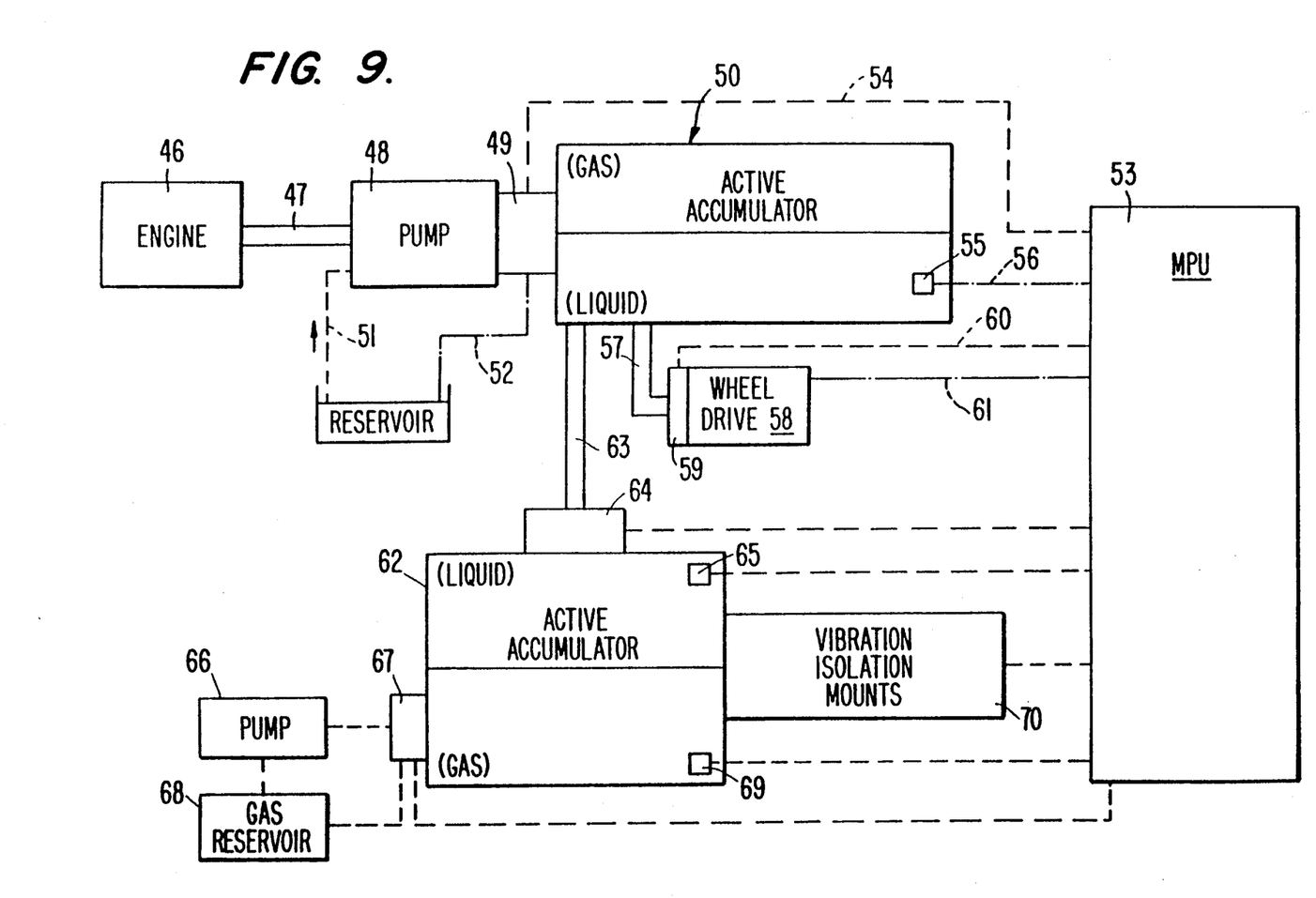
FIG. 9 is a schematic diagram of another embodiment of a vibration isolation support mounting system of the invention which includes fluid motor means for propelling a vehicle.

FIG. 9 schematically depicts a continuously active pressure accumulator power transfer system according to another embodiment of the invention. As illustrated in FIG. 9, a vehicle engine 46 is provided which includes a rotatable output shaft 47 drivingly connected to pump 48. Pump 48 has its outlet connected to a control valve manifold 49 which controls the supply of pressurized fluid to a first, main active accumulator 50. Lines 51 and 52 represent return lines to and from a fluid system reservoir.

The active accumulator 50 is maintained at a predetermined substantially constant pressure by the essentially constant velocity running engine 46 and pump 48. For this purpose, a microprocessor unit 53 is provided which includes an output control signal line 54 controlling the manifold valve 49 as a function of the pressure sensed by pressure sensor 55 and the pressure signal line 56. In addition to the liquid hydraulic fluid shown in the lower portion of the accumulator 50, a substantial portion of the fluid in the accumulator is a pressurized gas, shown in the upper portion of the accumulator. Because of its elastic properties, the gas acts as a shock and vibration absorber for the whole drive to avoid jerks and transmission of vibrations along the drive. A diaphragm or other member, illustrated schematically between the gas and liquid in the accumulator 50 separates the gas and liquid while allowing the gas to act as a spring cushion.

The active accumulator 50 is continuously communicated via pressure output line 57 with a vehicle wheel drive units 58. The accumulator 50 could also be used to directly power other components such as vehicle auxiliary units which are preferably driven by hydraulic fluid having a relatively high pressure. The hydraulic fluid to the wheel drive units 58 is controlled by as manifold valve assembly 59, controlled by the microprocessor line 60 as a function of the detected and desired wheel drive condition via detection line 61. The operation of the vehicle wheel drive unit 13 is described in detail in my copending application Ser. No. 07/381,197 the disclosure of which is hereby incorporated by reference. The wheel drive units 58 could also be operated in a conventional manner.

Although the disclosed embodiment relates to a vehicle with a wheel drive system, it should be understood that the invention could also be implemented in conjunction with a boat, where the boat propeller drive would be substituted for the wheel drive units 58. Other vehicle arrangements such as aircraft and the like could also utilize the present invention according to the disclosed, preferred embodiments thereof.

Further, although vehicle environments have been described in conjunction the illustrated preferred embodiment, the invention could also be used for certain stationary non-vehicle environments for driving devices. The devices powered by pressurized fluid from the main accumulator 50 could include other types of units than that shown and described, such as a small turbine or a high pressure pump whose output in turn is used to drive one or more auxiliary units.

The system of FIG. 9 further comprises a second active accumulator 62 which stores hydraulic fluid at predetermined pressure which is lower than the hydraulic fluid pressure in the first main active accumulator 50. Hydraulic fluid is conveyed from the main active accumulator 50 to the second active accumulator 62 by way of pressure output line 63 and control valve manifold 64. A pressure sensor 65 is located within the accumulator 62 for sensing the pressure of the hydraulic fluid in the accumulator. The microprocessor unit 53 receives a signal from the pressure sensor 65 and sends output signals to the control valve manifold 64 for maintaining the desired predetermined pressure in the accumulator 62. Instead of using the control valve manifold 64, microprocessor unit control 53 and pressure sensor 65', a capillary tube, for example, could be employed in the pressure output line 63 between the accumulator 50 and the accumulator 62 for maintaining a lower hydraulic fluid pressure in the accumulator 62 than in the accumulator 50.

Like the main active accumulator 50, the active accumulator 62 includes a gas cushion for absorbing vibration. The liquid and gas within the accumulator 62 are also separated from one another by a membrane such as a diaphragm, plate or other member shown schematically in FIG. 9, which allows the pressurized gas to act as a cushion against the pressurized hydraulic fluid in the accumulator. A pump 66, control valve manifold 67 and gas reservoir 68 are used to maintain the pressure of the gas in the accumulator at a predetermined setting. This is accomplished with a pressure sensor 69 for sensing the gas pressure in the accumulator. The output of the pressure sensor 69 is received by the microprocessor unit 53. An output signal from the microprocessor unit controls the operation of control valve manifold 67 for directing pressurized gas into the accumulator 62 or returning it to the reservoir 68 depending upon the sensed pressure. The paths of the electrical control signals are illustrated in dashed lines in FIG. 9. Alternatively, the pump 66, control valve manifold 67, gas reservoir 68 and pressure sensor 69 could be used to maintain gas pressure in the main accumulator 50 and the gas of the main accumulator communicated with that of the accumulator 62 via a pressure supply line with control valve to provide the necessary gas pressure.

The pressurized hydraulic fluid from the second active accumulator 62 is continuously communicated with one or more vibration isolation mounts 70 in the manner described above with respect to FIGS. 1-8. The vibration isolation mounts have relatively low fluid flow requirements and also relatively low fluid pressure requirements as compared with that required for vehicle wheel drive units 58. For example, the liquid pressure in the first main accumulator 50 may be on the order of 4,000-5,000 psi while the hydraulic fluid pressure requirement for the second active accumulator 62 for the vibration isolation mounts 70 is on the order of 300 psi. The flow requirements of the wheel drive units is also much greater than that of the vibration isolation mounts 70. The use of the two accumulators for the respective purposes more efficiently and quickly meets the pressurized fluid requirements of the mounts 70 as compared with an arrangement wherein there is direct communication of the pressurized fluid from the main active accumulator to the vibration isolation mounts by means of a capillary restriction or control valve in the communicating pressure line. The additional active accumulator also aids in preventing vibrations from being transferred along the drive train to and from the vibration isolation mounts.

Figure 10:
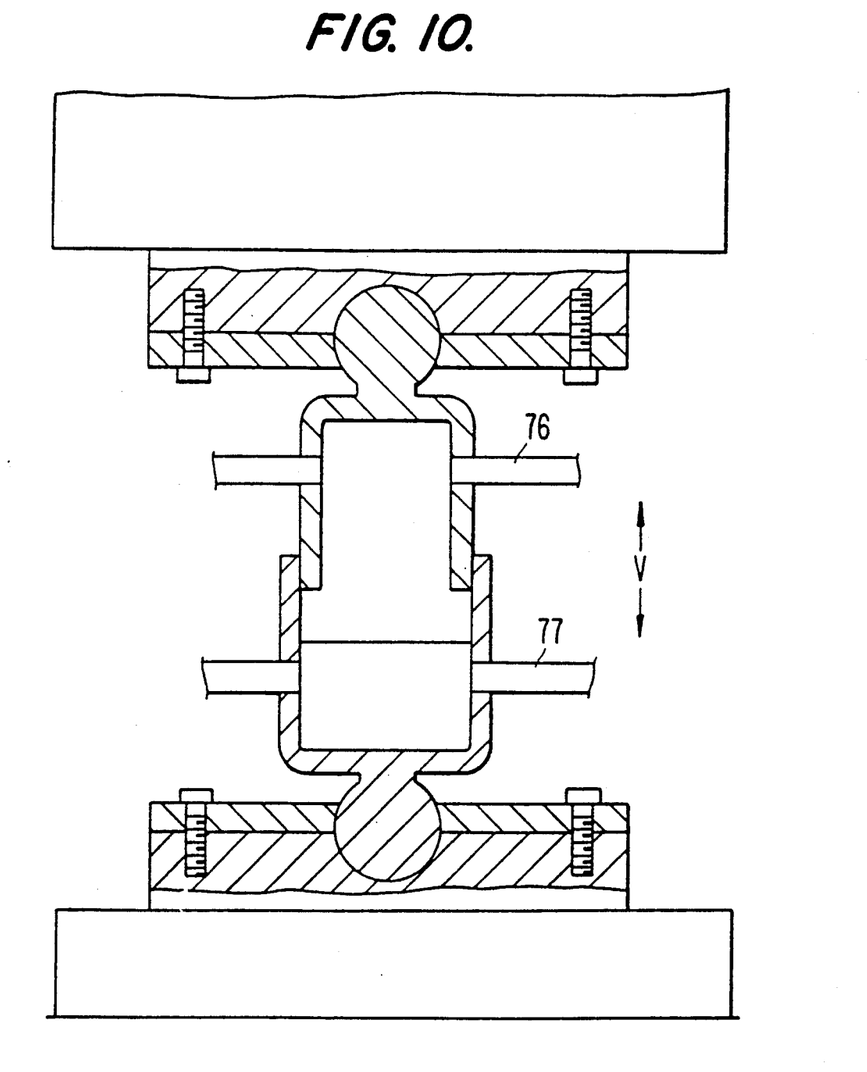
FIG. 10 is a schematic sectional view showing an individual vibration support mount constructed according to another embodiment of the invention.
Figure 11:
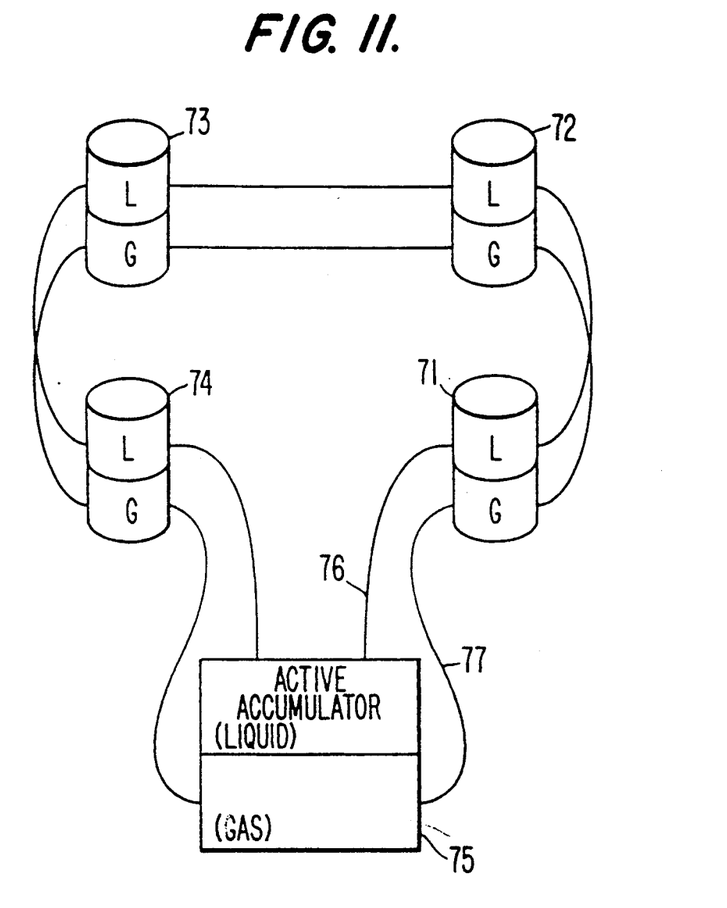
FIG. 11 is a schematic diagram of vibration isolation mounts of the type shown in FIG. 10 in the system of FIG. 9.

While the vibration isolation mounts in the embodiments of FIGS. 1-8 are independently communicated with the active accumulator, according to another form of the invention illustrated in FIG. 11, the vibration isolation mounts 71, 72, 73 and 74 are connected in series with the active accumulator 75 by means of pressure lines 76 and 77. One of the vibration isolation mounts 70 is illustrated in detail in FIG. 10. The others are of like construction. As indicated in the drawings, both the liquid and the gas in the vibration isolation mounts are respectively communicated in series with the liquid and gas in the active accumulator 75 by way of the pressure lines 76 and 77, respectively. The series arrangement is particularly advantageous in a balanced system where the mounts experience relatively uniform loads. The presence of the active accumulator 75 between the mounts and gas pump 66 also insulates against transmission of vibration to and from the mounts and the pump. It is also envisioned that only the gas cushions of each vibration isolation mount be connected in series with the active accumulator 75 or, alternatively, that only the liquid hydraulic fluid in each vibration isolation mount be communicated in series with that of the active accumulator for enhancing the performance of the system. In FIG. 11, the active accumulator 75 can be a main accumulator or a second active accumulator in a system of the type shown in FIG. 9.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A vibration isolating support mounting system for supporting a load of a first member on a second member and for attenuating transmission of vibrations between said members, said system comprising:

a plurality of load support vibration isolation mounts for disposal at spaced apart locations between the first and second members, each of said mounts including a first mount part securable to the first member, a second mount part securable to the second member, guide means for guiding relative movement of the first and second mount parts, and first spring cushion means and a high pressure hydraulic fluid medium means acting in series between the first and second mount parts for attenuating vibration induced force transfer between said first and second mount parts, a hydraulic fluid accumulator, means for maintaining a predetermined pressure of hydraulic fluid in the accumulator, and high pressure fluid line means for communication the accumulator pressure with high pressure hydraulic fluid medium means of the load support mounts, said high pressure hydraulic fluid medium means of the mounts being arranged in series along said high pressure fluid line means.

2. A system according to claim 1, wherein said accumulator includes second spring cushion means for vibration isolation, said first and second spring cushion means being gas cushions, and wherein means are provided for communicating the gas pressure in said first spring cushion means of the mounts with the gas pressure of said second spring cushion means of the accumulator.

3. A system according to claim 2, wherein means are provided for maintaining the gas pressure of said second spring cushion means of said accumulator at a predetermined pressure.

4. A system according to claim 1, wherein said guide means includes means for permitting universal pivotal movement of the first member with respect to the second member.

5. A system according to claim 1, wherein said guide means includes slidably interengagable cylinder walls attached to the respective first and second mount parts, said cylinder walls enclosing a pressure space for the high pressure hydraulic fluid medium means.

6. A system according to claim 5, wherein the accumulator has a volume which is substantially greater than the volume of the pressure space enclosed by the cylinder walls.

7. A system according to claim 6, wherein the accumulator has a volume which is more than ten times the volume of the pressure space enclosed by the cylinder walls at a respective single vibration isolation mount.

8. A system according to claim 5, wherein the combined fluid accommodating volume of the pressure spaces at said support vibration mounts and the high pressure fluid line means is substantially smaller than the volume of the accumulator.

9. A system according to claim 1, wherein said first member is an internal combustion engine of a vehicle and said second member is a vehicle body frame member.

10. A system according to claim 1, wherein said first member is a helicopter blade drive assembly and said second member is a helicopter frame body member.

11. A system according to claim 1, wherein said guide means includes spherical bolt connection means for at least one of the first and second mount parts.

12. A system according to claim 1, wherein at least four support vibration mounts are provided.

13. A system according to claim 1, wherein said first member is a component of a vehicle which includes fluid motor means for propelling the vehicle, said system further comprising means for supplying driving fluid pressure to the fluid motor means.

14. A vibration isolation support mounting system for supporting a load of a first member on a second member and for attenuating transmission of vibrations between said members, said system comprising:

a plurality of load support vibration isolation mounts for disposal at spaced apart locations between the first and second members, each of said mounts including a first mount part securable to the first member, a second mount part securable to the second member, guide means for guiding relative movement of the first and second mount parts, and first spring cushion means and high pressure hydraulic fluid medium means acting in series between the first and second mount parts for attenuating vibration induced force transfer between said first and second mount parts, a hydraulic fluid accumulator with second spring cushion means for vibration insulation, means for maintaining a predetermined pressure of hydraulic fluid in the accumulator, high pressure fluid line means communicating the hydraulic fluid in the accumulator with the high pressure hydraulic fluid medium means of the load support mounts, and wherein said first and second spring cushion means are gas cushions, and wherein means are provided for communicating the gas of said first spring cushion means of the mounts in series with the gas of said second spring cushion means of the accumulator.

15. In combination, a load, a support and a vibration isolation support mounting system for supporting the load with respect to the support and for attenuating transmission of vibrations between the load and support, said mounting system comprising:

a plurality of load support vibration isolation mounts for disposal at spaced apart locations between the load and the support, each of said mounts including a first mount part securable to the load, a second mount part securable to the support, guide means for guiding relative movement of the first and second mount parts, and first spring cushion means and high pressure hydraulic fluid medium means acting in series between the first and second mount parts for attenuating vibration induced force transfer between said first and second mount parts, a hydraulic fluid accumulator, means for maintaining a predetermined pressure of hydraulic fluid in the accumulator, and high pressure fluid line means for communicating the accumulator pressure with the high pressure hydraulic fluid medium means of the load support mounts, said high pressure hydraulic fluid medium means of the mounts being arranged in series along said high pressure fluid line means.

16. The combination according to claim 15, wherein the load and support are components of a vehicle.

17. The combination according to claim 16, wherein the vehicle includes fluid motor means for propelling the vehicle, said system further comprising means for supplying driving hydraulic fluid pressure for the fluid motor means.

18. The combination according to claim 16, wherein said load is an internal combustion engine of the vehicle and said support is a vehicle body frame member.

* * * * *